United States Patent [19]

Dester et al.

[11] 4,150,857
[45] Apr. 24, 1979

[54] ARMORED CUSHIONING LUG FOR TRACK-TYPE VEHICLES

[75] Inventors: Delbert D. Dester, Washington; Paul L. Wright, Peoria, both of Ill.

[73] Assignee: Caterpillar Tractor Co., Peoria, Ill.

[21] Appl. No.: 869,557

[22] Filed: Jan. 16, 1978

[51] Int. Cl.² ............................................. B62D 55/20
[52] U.S. Cl. .................................... 305/12; 267/63 R; 305/57
[58] Field of Search ............................ 305/12, 11, 57; 267/63 R, 153

[56] References Cited

U.S. PATENT DOCUMENTS

| | | | |
|---|---|---|---|
| 2,044,649 | 6/1936 | Swennes et al. | 267/63 R X |
| 3,447,814 | 6/1969 | Siber et al. | 267/153 X |
| 3,625,501 | 12/1971 | Hein et al. | 267/153 |
| 3,887,244 | 6/1975 | Haslett et al. | 305/57 |
| 3,897,980 | 8/1975 | Dester et al. | 305/57 |

Primary Examiner—John P. Shannon
Attorney, Agent, or Firm—Phillips, Moore, Weissenberger, Lempio & Majestic

[57] ABSTRACT

An endless track assembly for a track-type vehicle comprises a plurality of track shoes secured to an articulated chain. The links of the chain are pivotally interconnected together by pin and bushing assemblies adapted to engage a drive sprocket of the vehicle. A cushioning lug is secured to each track shoe, intermediate each pair of adjacent pin and bushing assemblies, for attenuating the noise level of the track assembly upon its engagement with the drive sprocket and for aiding in cleaning the sprocket. Each cushioning lug assembly comprises a resilient cushioning block composed of an elastomeric material, a cap mounted on the cushioning block and offset arcuate bearing flanges and a cleaning flange formed integrally on the cap.

17 Claims, 4 Drawing Figures

ARMORED CUSHIONING LUG FOR TRACK-TYPE VEHICLES

BACKGROUND OF THE INVENTION

This invention relates to an endless track assembly for a track-type vehicle having a cushioning lug secured to each track shoe thereof to attenuate the noise level of the track assembly during operation.

A conventional track assembly comprises a plurality of track shoes secured to an articulated chain with the chain adapted to engage a drive sprocket. Engagement of the chain with the drive sprocket gives rise to high noise levels. In addition, engagement of drive bushings of the chain with the sprocket tends to unduly wear the bushings whereby they require periodic repair or replacement.

U.S. Pat. No. 3,887,244, assigned to the assignee of this application, for example, discloses combined cushioning and impact lugs secured to each track shoe of a track assembly to reduce noise levels. As also taught in such patent, it has proven further desirable to fully protect an elastomeric block of each cushioning lug and to extend the service life thereof by protecting it with a wear-resistant metallic cap. Prior art lug arrangements of this type may not provide the desired substantial and continuous bearing contact as between the cap and the teeth of the drive sprocket. In addition, the cap is not constructed to provide a self-cleaning function whereby the roots of the sprocket are continuously cleaned of dirt build-up and the like.

SUMMARY OF THIS INVENTION

The present invention is directed to overcoming one or more of the problems as set forth above.

The improved cushioning lug means of this invention comprises a resilient cushioning means having a cap means mounted thereon adapted to engage the teeth of a drive sprocket. An arcuately shaped bearing flange means, generally conformed to each root of the drive sprocket, is secured on the cap means to effect such engagement.

In one aspect of this invention, the bearing flange means comprises a plurality of offset flanges whereas in another aspect of this invention a cleaning and reinforcing flange means is secured on the cap means in transverse relationship relative to the bearing flange means for continuously cleaning the teeth of the drive sprocket.

BRIEF DESCRIPTION OF THE DRAWINGS

Other objects of this invention will become apparent from the following description and accompanying drawings wherein.

DETAILED DESCRIPTION

Figure 1:
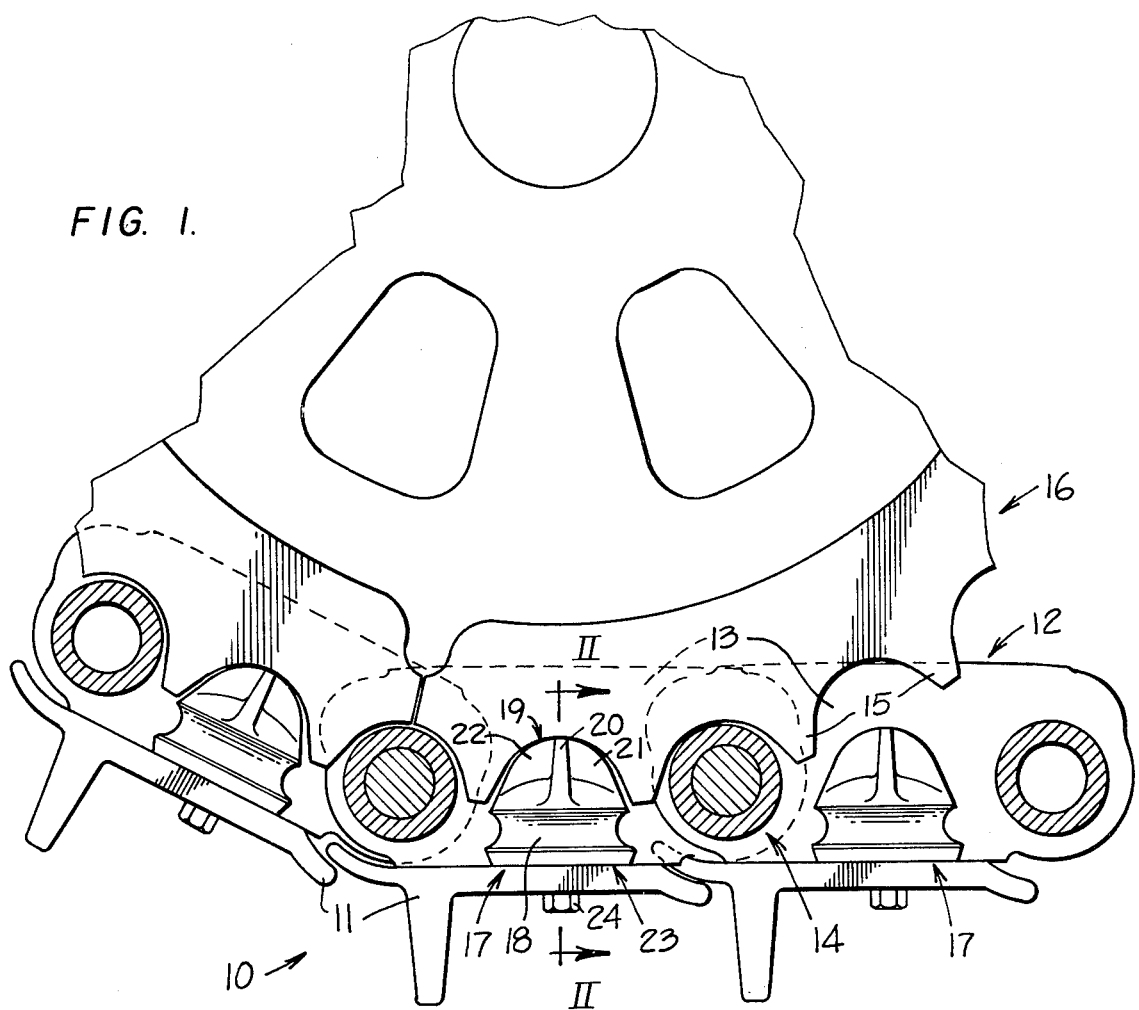
FIG. 1 is a partially sectioned side elevational view of an endless track assembly for a track-type vehicle shown engaging a drive sprocket and having a plurality of cushioning lugs of this invention employed therein.

Referring to FIG. 1, an endless track assembly 10 comprises a plurality of track shoes 11 secured to an articulated chain 12 in a conventional manner. Laterally spaced pairs of links 13 of the chain are pivotally interconnected by a pin and bushing assembly 14. Each pin and bushing assembly is adapted to engage within a notch or root defined between each circumferentially adjacent pair of teeth 15 of a sprocket 16 for driving the track assembly in a conventional manner.

Figure 3:
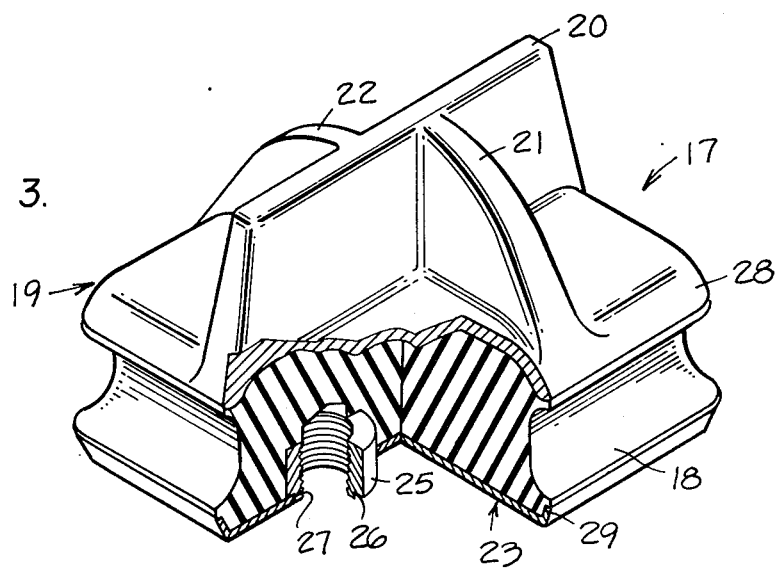
FIG. 3 is a partially sectioned isometric view of the cushioning lug.
Figure 2:
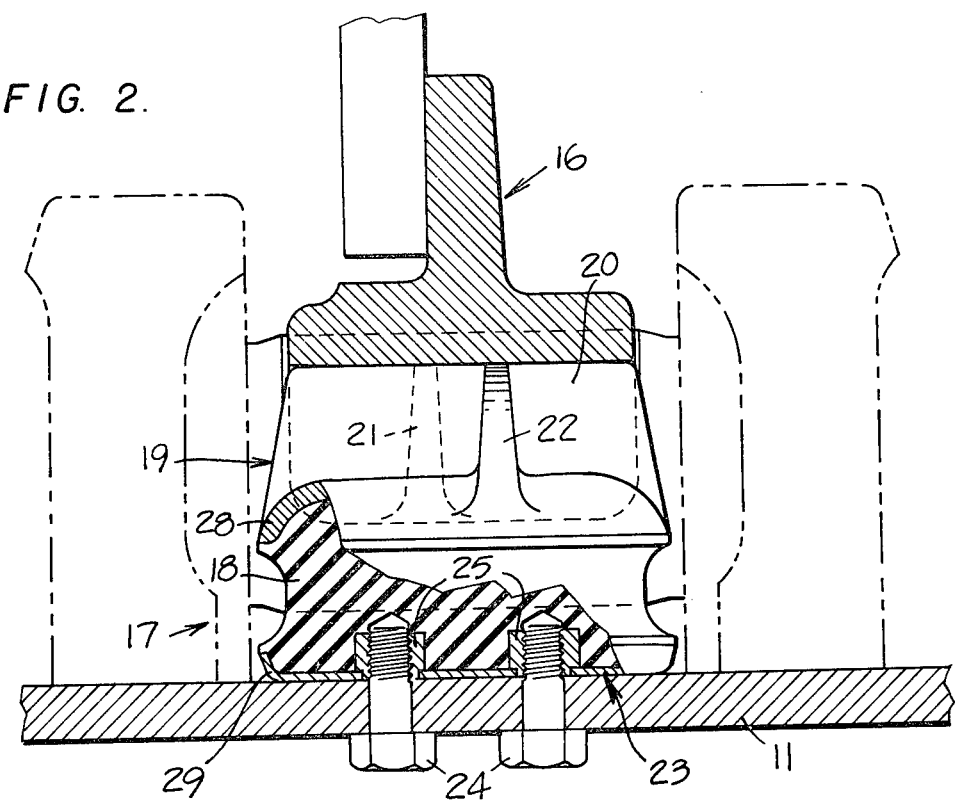
FIG. 2 is an enlarged sectional view, particularly illustrating one of the cushioning lugs, taken in the direction of arrows II—II in FIG. 1.
Figure 4:
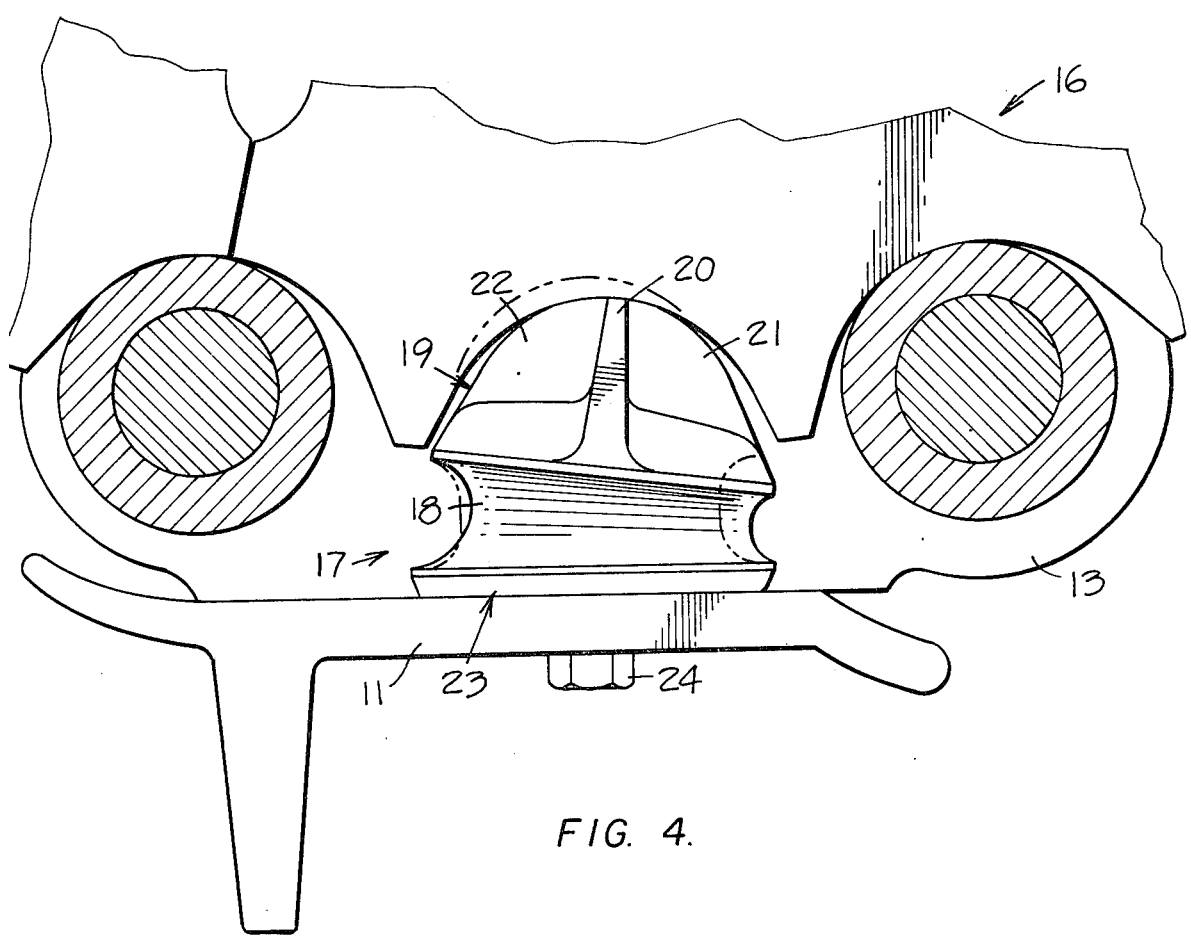
FIG. 4 is a side elevational view of the cushioning lug, showing its compressed, sprocket engaging condition during operation of the track assembly.

This invention is directed to a cushioning lug means 17 preferably secured to each track shoe 11 and disposed intermediate (mid-pitch) adjacent pairs of pin and bushing assemblies 14 for attenuating the noise level of the track assembly. Referring to FIGS. 2 and 3, each cushioning lug means comprises a resilient spring means or cushioning block 18 suitably composed of an elastomeric material, such as rubber. A hardened metallic cap means 19 is mounted on the cushioning block and is adapted to engage the root defined between each pair of circumferentially adjacent teeth 15 of sprocket 16, as shown in FIG. 1.

The cap means comprises a transversely extending cleaning and reinforcing flange 20, extending the full width of lug 17, to aid in structurally reinforcing the lug means and to continuously clean the root areas between sprocket teeth 15 (FIG. 1). A pair of offset drive flanges or bearing flange means 21 and 22 are secured on either side of the reinforcing flange to extend the full length of the lug. The latter flanges extend transversely (perpendicular) relative to the pivot axes of pin and bushing assemblies 14 and to flange 20.

As shown in FIG. 1, flanges 21 and 22 have arcuate peripheries and profiles generally conforming to the root defined between each circumferentially adjacent pair of teeth 15 of sprocket 16. The offset relationship of flanges 21 and 22 distributes the wear effects on sprocket 16 to increase the service life thereof. The cap means, including flanges 20–22, may be suitably composed of carburized and hardened low alloy steel, hardened plain carbon steel or chilled iron to extend its wear capabilities.

FIGS. 2 and 3 further illustrate a mounting plate 23 disposed on each track shoe 11 and secured thereon by a pair of bolts 24 and nuts 25. Each nut is suitably embedded in cushioning block 18 and defines an annular recess 26 on a lower end thereof which is received in a circular mounting hole 27, formed through mounting plate 23. Block 18 is suitably bonded between cap means 17 and plate 23. Flanges 28 and 29 are formed on the peripheries of cap means 19 and plate 23, respectively, to overlie edges of block 18 to further aid in retaining the block in position therebetween.

In operation, rotation of sprocket 16 will function to drive track assembly 12 in the manner described above. Each cushioning lug means will engage the root or notch defined between each pair of circumferentially adjacent sprocket teeth to attenuate the overall noise level of the operating track assembly, primarily due to the substantial bearing contact maintained as between flanges 21 and 22 and the sprocket teeth. In addition, flange 20 will continuously function to maintain the sprocket teeth in a substantially dirt-free condition of operation.

The embodiment of this invention in which an exclusive property or privilege is claimed are defined as follows:

1. An endless track assembly for a track-type vehicle comprising
   a drive sprocket comprising a plurality of circumferentially adjacent teeth,
   a plurality of track shoes,
   an articulated chain secured to said track shoes comprising a plurality of pivotally interconnected links,
   pin and bushing means pivotally interconnecting adjacent links together and positioned to engage the teeth of said drive sprocket for driving said track assembly,
   cushioning lug means secured to at least some of said track shoes, intermediate adjacent pairs of said pin and bushing means, for attenuating the noise level of said track assembly upon engagement with said drive sprocket, said lug means comprising
   resilient spring means,
   cap means mounted on said spring means and adapted to engage the teeth of said drive sprocket,
   arcuately shaped bearing flange means secured on said cap means to extend transversely relative to pivot axes of said pin and bushing means and having a profile at least generally conforming to a respective root of said drive sprocket defined between each pair of circumferentially adjacent teeth thereof, and
   cleaning and reinforcing flange means secured on said cap means and disposed transversely relative to said bearing flange means for continuously cleaning the roots of said drive sprocket upon rotation thereof.

2. The endless track assembly of claim 1 wherein said bearing flange means comprises a pair of flanges disposed on either side of said cleaning and reinforcing flange means.

3. The endless track assembly of claim 2 wherein said reinforcing flange means constitutes a single flange extending at least substantially the full width of said lug means.

4. The endless track assembly of claim 2 wherein said pair of flanges are further disposed in offset relationship relative to each other and extend at least substantially the full length of said lug means.

5. The endless track assembly of claim 1 further comprising a mounting plate secured to said track shoe and wherein said spring means is mounted on and secured to said mounting plate.

6. The endless track assembly of claim 5 wherein said spring means constitutes an elastomeric block and further comprising at least one nut embedded in said block and a bolt extending through said track shoe and said mounting plate and threadably attached to said nut.

7. The endless track assembly of claim 6 further comprising a flange formed on the periphery of each of said cap means and said plate to overlie edges of said block for aiding in retaining said block in position therebetween.

8. The endless track assembly of claim 6 wherein said block is bonded between said cap means and said plate.

9. A cushioning lug adapted to be secured to a track shoe of an endless track assembly for attenuating the noise level thereof comprising
   resilient spring means,
   cap means mounted on said spring means,
   arcuately shaped bearing flange means secured on said cap means to extend at least substantially across the length thereof adapted to engage teeth of a drive sprocket, and
   cleaning and reinforcing flange means secured on said cap means and disposed transversely relative to said bearing flange means adapted for continuously cleaning roots of a drive sprocket upon rotation thereof.

10. The cushioning lug of claim 9 wherein said bearing flange means comprises a pair of flanges disposed on either side of said cleaning and reinforcing flange means.

11. The cushioning lug of claim 10 wherein said reinforcing flange means constitutes a single flange extending at least substantially the full width of said lug means.

12. The cushioning lug of claim 10 wherein said pair of flanges are further disposed in offset relationship relative to each other and extend at least substantially the full length of said lug means.

13. The cushioning lug of claim 9 further comprising a mounting plate and wherein said spring means is mounted on and secured to said mounting plate.

14. The cushioning lug of claim 13 wherein said spring means constitutes an elastomeric block and further comprising at least one nut embedded in said block and adapted to be secured to a track shoe by a bolt.

15. The cushioning lug of claim 14 further comprising a flange formed on the periphery of each of said cap means and said plate to overlie edges of said block for aiding in retaining said block in position therebetween.

16. The cushioning lug of claim 14 wherein said block is bonded between said cap means and said plate.

17. A cushioning lug means adapted to be secured to a track shoe of an endless track assembly for attenuating the noise level thereof comprising
    resilient spring means,
    cap means mounted on said spring means, and
    a plurality of arcuately shaped flanges secured on said cap means to extend at least substantially across the length thereof adapted to engage teeth of a drive sprocket, said flanges being disposed in offset relationship relative to each other to distribute wear effects on the sprocket to increase the service life thereof.

* * * * *